United States Patent [19]

Gitlin et al.

[11] Patent Number: 4,644,537
[45] Date of Patent: Feb. 17, 1987

[54] INBAND CODING OF SECONDARY DATA

[75] Inventors: Richard D. Gitlin, Little Silver; Jean-Jacques Werner, Holmdel, both of N.J.

[73] Assignees: American Telephone and Telegraph Company, New York, N.Y.; AT&T Information Systems Inc., Holmdel, N.J.

[21] Appl. No.: 685,445

[22] Filed: Dec. 24, 1984

[51] Int. Cl.[4] .............................................. H04L 3/00
[52] U.S. Cl. ...................................... 370/119; 375/39
[58] Field of Search ............... 370/110.4, 119; 375/39, 375/110

[56] References Cited

U.S. PATENT DOCUMENTS 3,955,141  5/1976  Lyon et al. ............................. 375/39
4,227,152 10/1980  Godard et al. ........................ 375/39
4,271,527  6/1981  Armstrong ............................ 375/39
4,408,325 10/1983  Grover ................................. 370/119
4,442,530  4/1984  Parrish, Jr. et al. .................. 375/39
4,571,549  2/1986  Lods et al. ............................ 375/39

Primary Examiner—Douglas W. Olms
Assistant Examiner—Kenneth I. Rokoff
Attorney, Agent, or Firm—Ronald D. Slusky

[57] ABSTRACT

In a system for communicating primary and secondary data from a transmitter to a receiver, each of a first plurality of primary data word values is communicated by transmitting an individual channel symbol associated with that value, while at least one other primary data word value is communicated by transmitting a selected one of at least two other channel symbols associated with that one other value. The selected symbol is a function of the value of an individual secondary data word. In the receiver, both the primary and secondary data word values are recovered from the channel symbols thus transmitted.

24 Claims, 3 Drawing Figures

INBAND CODING OF SECONDARY DATA

BACKGROUND OF THE INVENTION

The present invention relates to techniques for communicating primary and secondary data streams over a communication channel.

It is often desirable in data communications applications to transmit not only principal, or primary, data, but also secondary data. For example, present-day voiceband data sets, or modems—particularly those designed for private-line operation—are often arranged to not only transmit the so-called user's data, but also diagnostic and/or maintenance data via which the data sets themselves communicate.

Conventionally, the available transmission bandwidth is divided into so-called primary and secondary channels in which the primary and secondary data are respectively transmitted. Depending, however, on the desired primary data transmission speed and the expected quality of the transmission channel, the primary channel bandwidth requirements may be such as to preclude this approach because every Hertz of bandwidth may be needed for the primary channel.

SUMMARY OF THE INVENTION

In accordance with the present invention, each one of a first plurality of primary data word values is communicated by transmitting an individual one of a predetermined plurality of channel symbols associated with that particular value, as is conventional, while at least one other primary data word value is communicated by transmitting a selected one of at least two other channel symbols associated with that one other value, the selected symbol being a function of the value of an individual one of the secondary data words. In the receiver, both the primary and secondary data word values are recovered from the channel symbols thus transmitted.

DETAILED DESCRIPTION

Figure 1:
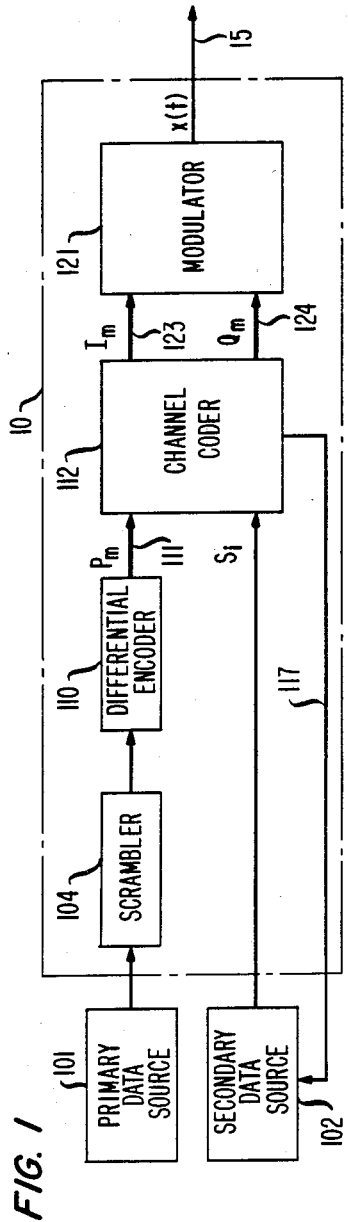
FIG. 1 is a block diagram of a data communication transmitter embodying the principles of the invention.

Transmitter 10 of FIG. 1 includes a scrambler 104, primary data differential encoder 110, secondary data differential encoder 115, channel coder 112 and double sideband-quadrature carrier (DSB-QC) modulator 121.

Scrambler 104, in particular, receives a stream of binary data from primary data source 101 which may be, for example, a digital computer. Scrambler 104, which is of conventional design, pseudo-randomizes the primary data to prevent concentrations of energy across the spectrum of the DSB-QC signal ultimately to be generated by modulator 121. The output of scrambler 104 is a serial bit stream which is applied to differential encoder 110 at a rate of n/T bits/second, where 1/T is a predetermined symbol rate and n is a predetermined integer. Illustratively, for a 9600 bps system, 1/T=2400 and n=4.

Differential encoder 110, which is also of conventional design, processes each successive group of n=4 bits provided from source 101 during the $m^{th}$ baud interval to generate a differentially encoded 4-bit word $P_m$ on cable 111. In accordance with conventional practice, the differential encoding performed by differential encoder 110 is such as to allow the receiver to recover the transmitted data correctly, notwithstanding possible symbol constellation "rotations" as the result, for example, of phase hits in the transmission channel.

At the same time, secondary data from a secondary data source 102 is directly applied to channel coder 112. Secondary data source 102, which may be, for example, a microprocessor-based subsystem of a data set, or modem, of which transmitter 10 is a part, generates various diagnostic and/or maintenance signals which are to be conveyed to, for example, a companion unit within a data set of which receiver 20 (FIG. 2) is a part. The output of secondary data source 102 is a stream of secondary data words $S_i$. In this embodiment, as will be seen, each of words $S_i$ illustratively comprises a single data bit.

The primary and secondary data words are applied to channel coder 112. The latter responds to those inputs to generate on cables 123 and 124 digital representations of the in-phase and quadrature-phase components of a particular two-dimensional channel symbol, or point, of a predetermined signal constellation, the in-phase and quadrature-phase components generated for the $m^{th}$ symbol interval being designated $I_m$ and $Q_m$, respectively. Cables 123 and 124 extend to modulator 121, which generates a DSB-QC signal whose in-phase and quadrature-phase carriers have $I_m$ and $Q_m$ as their respective amplitudes for the $m^{th}$ symbol interval, so that the so-called carrier "state"—meaning those characteristics of the carrier signal which are information-bearing—is fixed for the duration of the transmission of the channel symbol in question. The DSB-QC signal thus generated, after conventional spectral shaping, is applied to a transmission, or communication, channel 15 as signal x(t).

Figure 3:
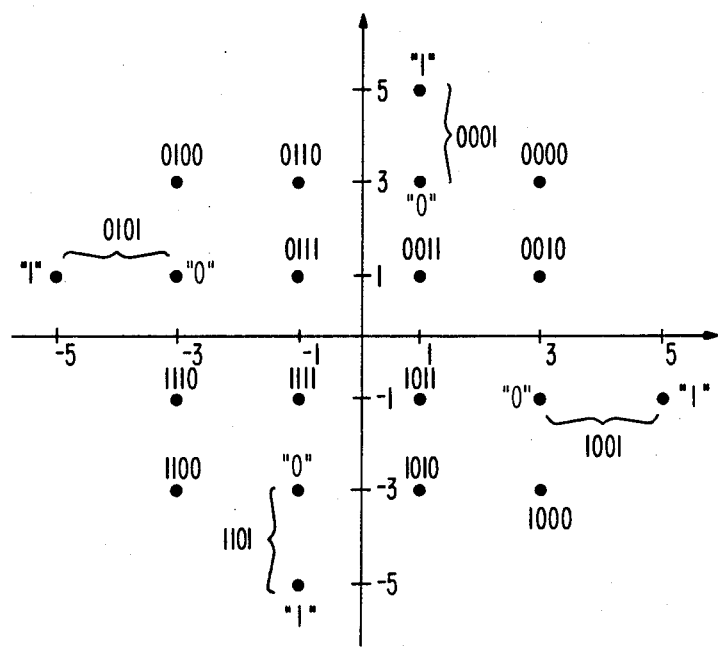
FIG. 3 is an exemplary constellation of channel symbols used to communicate primary and secondary data between the transmitter of FIG. 1 and receiver of FIG. 2 in accordance with the invention.

FIG. 3 depicts the aforementioned signal constellation. This constellation includes the points of a standard 16-point quadrature amplitude modulation (QAM) constellation, each of whose channel symbols has in-phase and quadrature-phase components having one of the four values ±1, ±3. The constellation further includes the four additional points (1,5), (−5,1), (5,−1) and (−1,−5), for a total of twenty. As shown in FIG. 3, each one of twelve of the sixteen possible 4-bit values for word $P_m$, generated by differential encoder 110, is uniquely associated with, or represents, a single one of the constellation points, these being the values 0100, 0110, 0000, 0111, 0011, 0010, 1110, 1111, 1011, 1100, 1010 and 1000, which are respectively associated with, or represent, the constellation points (−3,3), (−1,3), (3,3), (−1,1), (1,1), (3,1), (−3,−1), (−1,−1), (1,−1), (−3,−3), (1,−3), and (3,−3). In accordance with the invention, each one of the other four possible 4-bit values for word $P_m$—0001, 0101, 1001 and 1101—is associated with, or represents, a respective two constellation points, each set of two points, in this embodiment, having either their x or y coordinates in common. In particular, 0001 is associated with the points (1,3) and (1,5), 0101 is associated with the points (−3,1) and (−5,1), 1001 is associated with the points (3,−1) and (5,−1), and 1101 is associated with the points (−1,−3) and (−1,−5).

Whenever word $P_m$ has one of the twelve values 0100, 0110, 0000, 0111, 0011, 0010, 1110, 1111, 1011, 1100, 1010 and 1000, channel coder 112 generates as $I_m$ and $Q_m$ the in-phase and quadrature-phase components of the one and only symbol with which that value is associated. The fact, however, that there are two symbols associated with each of the values 0001, 0101, 1001 and 1101 allows for the secondary data words $S_i$ to be transmitted, the particular one of the two symbols that is actually transmitted being, in fact, a function of the value of that word. In particular, whenever primary data word $P_m$ has one of the values 0001, 0101, 1001, or 1101 and the next secondary data word $S_i$ waiting to be transmitted is a "0", channel coder 112 generates the symbol (1,3), (−3,1), (3,−1) or (−1,−3), respectively. Or if the next $S_i$ waiting to be transmitted is a "1", channel coder 112 generates the symbol (1,5), (−5,1), (5,−1) or (−1,−5), respectively. Thus each of the symbols (1,3), (−3,1), (3,−1), (−1,−3), (1,5), (−5,1), (5,−1) and (−1,−5) represents both a primary and a secondary data word value.

The overall mapping of primary and secondary data word values to in-phase and quadrature-phase symbol component values performed by channel coder 112 is shown in Table I, in which x indicates that no secondary data word is transmitted.

TABLE I

| $P_m$ | $S_i$ | $I_m$ | $Q_m$ |
|---|---|---|---|
| 0000 | x | 3 | 3 |
| 0001 | 0 | 1 | 3 |
| 0001 | 1 | 1 | 5 |
| 0010 | x | 3 | 1 |
| 0011 | x | 1 | 1 |
| 0100 | x | −3 | 3 |
| 0101 | 0 | −3 | 1 |
| 0101 | 1 | −5 | 1 |
| 0110 | x | −1 | 3 |
| 0111 | x | −1 | 1 |
| 1000 | x | 3 | −3 |
| 1001 | 0 | 3 | −1 |
| 1001 | 1 | 5 | −1 |
| 1010 | x | 1 | −3 |
| 1011 | x | 1 | −1 |
| 1100 | x | −3 | −3 |
| 1101 | 0 | −1 | −3 |
| 1101 | 1 | −1 | −5 |
| 1110 | x | −3 | −1 |
| 1111 | x | −1 | −1 |

Channel coder 112 is illustratively realized as a read-only memory which implements this table.

The fact that a secondary data word waiting to be transmitted can be transmitted only when a primary data word has one of four values means that the average information rate for the secondary channel is $\frac{1}{4}$th the symbol rate (i.e., $\frac{1}{4}$ T), assuming that the primary and secondary data word values occur randomly. It also means that transmission of the secondary data is asynchronous. Although not explicitly shown in the drawing, the latter fact simply implies that the secondary data should, for example, be buffered at some point prior to its application to channel coder 112, such as within secondary data source 102. To this end, as shown in the drawing, channel coder 112 is illustratively arranged to feed back a control signal on lead 117 to secondary data source 102 as each successive secondary data word is transmitted.

Moreover, the fact that the transmission of any of the four primary data word values 0001, 0101, 1001 or 1101 necessarily implies the transmission of some secondary word value means that some technique needs to be implemented in order for the receiver to determine which data received over the secondary channel actually originated with secondary data source 102 and which data was transmitted simply as a result of the fact that the transmitter necessarily transmits some value over the secondary channel whenever one of those four primary data word values is transmitted. One way this can be handled is to use a conventional asynchronous transmission format wherein the secondary data originating from secondary data source 102 is transmitted as characters of predetermined length bracketed by start and stop bits, with a selected bit value (e.g., "0") being transmitted continuously in the intervals between those characters.

Figure 2:
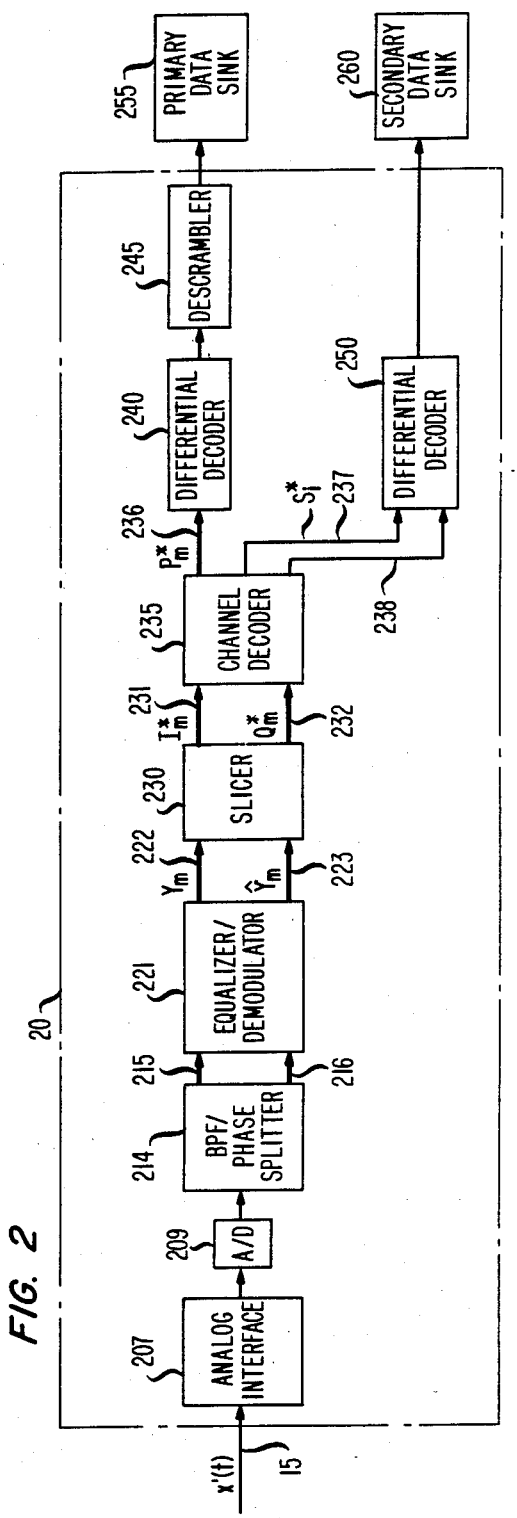
FIG. 2 is a block diagram of a data communication receiver embodying the principles of the invention.

Returning now to the block diagrams, signal x(t) generated by transmitter 10 is corrupted in channel 15 by such impairments as Gaussian noise, phase jitter, frequency offset and intersymbol interference. As shown in FIG. 2, the received corrupted signal x'(t) is applied within receiver 20 to analog interface 207 which includes an antialising filter and automatic gain control (AGC) circuit. The resulting signal is then applied to A/D converter 209. The resulting digital samples are applied to bandpass filter/phase splitter 214. The latter provides two outputs on cables 215 and 216, these being a digital bandpass-filtered version of the A/D converter output and the Hilbert transform of same, respectively.

The signals on cables 215 and 216 are applied to equalizer/demodulator 221, which, for each symbol interval, provides on its output cables 222 and 223 a pair of baseband equalizer outputs $Y_m$ and $\hat{Y}_m$, which respectively represent the values of the in-phase and quadrature-phase components of the received data symbol currently being processed. Because, for example, the equalizer cannot perfectly compensate for all channel impairments, the values of $Y_m$ and $\hat{Y}_m$ are not, in general, whole integers, even though $I_m$ and $Q_m$ are illustratively integer-valued. It thus remains to determine from $Y_m$ and $\hat{Y}_m$ what $I_m$ and $Q_m$ most likely were. This function is performed by slicer 230, which provides on its output cable 231 (232) signal $I_m^*$ ($Q_m^*$), this being a digital representation of the particular one of the values ±1, ±3, ±5 to which the value of $Y_m$ ($\hat{Y}_m$) is closest. $I_m^*$ and $Q_m^*$ then pass to channel decoder 235, which performs the opposite function to channel coder 112 of transmitter 10 by providing on its output cable 236 and output lead 237 the signals $P_m^*$ and $S_i^*$, these being the receiver's decision as to what the values of $P_m$ and $S_i$ were. Decoder 235 is illustratively realized as a read-only memory implementing Table II, where x denotes that no secondary data word is output. Word $P_m^*$ is then differentially decoded and descrambled by primary data decoder 240 and descrambler 245, respectively, and then applied to primary data sink 255 which may be, for example, a computer terminal.

TABLE II

| $I_m^*$ | $Q_m^*$ | $P_m^*$ | $S_i^*$ |
|---|---|---|---|
| 1 | 1 | 0011 | x |
| 1 | 3 | 0001 | 0 |
| 1 | 5 | 0001 | 1 |
| 3 | 1 | 0010 | x |
| 3 | 3 | 0000 | x |
| 3 | 5 | 0000 | x |
| 5 | 1 | 0010 | x |
| 5 | 3 | 0000 | x |
| 5 | 5 | 0000 | x |
| 1 | −1 | 1011 | x |
| 1 | −3 | 1010 | x |

TABLE II-continued

| $I_m{}^*$ | $Q_m{}^*$ | $P_m{}^*$ | $S_i{}^*$ |
|---|---|---|---|
| 1 | −5 | 1010 | x |
| 3 | −1 | 1001 | 0 |
| 3 | −3 | 1000 | x |
| 3 | −5 | 1000 | x |
| 5 | −1 | 1001 | 1 |
| 5 | −3 | 1000 | x |
| 5 | −5 | 1000 | x |
| −1 | 1 | 0111 | x |
| −1 | 3 | 0110 | x |
| −1 | 5 | 0110 | x |
| −3 | 1 | 0101 | 0 |
| −3 | 3 | 0100 | x |
| −3 | 5 | 0100 | x |
| −5 | 1 | 0101 | 1 |
| −5 | 3 | 0100 | x |
| −5 | 5 | 0100 | x |
| −1 | −1 | 1111 | x |
| −1 | −3 | 1101 | 0 |
| −1 | −5 | 1101 | 1 |
| −3 | −1 | 1110 | x |
| −3 | −3 | 1100 | x |
| −3 | −5 | 1100 | x |
| −5 | −1 | 1110 | x |
| −5 | −3 | 1100 | x |
| −5 | −5 | 1100 | x |

Word $S_i$ is differentially decoded by secondary data differential decoder 250 and thence applied to secondary data sink 260 which may be, for example, a subsystem within a data set of which receiver 20 is a part.

A flag bit on lead 238 is activated by decoder 235 each time word $P_m{}^*$ is one of the four words 0001, 0101, 1001 or 1101, thereby indicating to differential decoder 250 that the present signal level on lead 237 represents a newly-arrived secondary data word.

Since there are symbols in the FIG. 3 constellation representing secondary data "0"s and "1"s which are relatively close to one another in the constellation, random errors, i.e., the detection of a "1" when a "0" was transmitted and vice versa, may occur as the result, for example, of simple channel noise. Two further kinds of errors that may occur in the secondary data are "additions" and "erasures". An erasure occurs whenever one of the points (1,5), (1,−5), (−1,5) or (−1,−5) is actually transmitted but due, for example, to a transmission error, the decision at the receiver is that one of the other sixteen points of the constellation was transmitted. An addition occurs when the decision at the receiver is that one of the points (1,5), (1,−5), (−1,5) or (−1,−5) was transmitted even though the point that was actually transmitted is one of the other sixteen points.

These various errors can be detected by, for example, transmitting each secondary data bit twice. If this repetition is not observed by secondary data sink 260, it is known that an error has occurred, in which case data sink 260 can initiate a request for secondary data source 102 to retransmit the erroneous data (it being assumed that the transmitter and receiver of FIGS. 1 and 2 are parts of respective data sets in which a similar transmitter/receiver pair communicates primary and secondary data in the other direction over channel 15). Synchronization can then be re-established by having secondary data source 102 initially transmitting a known bit sequence.

Going beyond error detection, an error correction technique can be implemented in at least some embodiments of our invention. See, for example, the co-pending, commonly-assigned U.S. patent application, Ser. No. 685,487, filed of even date herewith by H. K. Thapar.

The foregoing merely illustrates the principles of the invention, some variations of which include selection of different, and a different number of, symbols, including different in-phase and quadrature-phase component values, to carry the secondary data, as well as the possibility of encoding secondary data words of more than one bit. Moreover, the invention is applicable to virtually any type of constellation geometry, including constellations which are other than rectilinear (e.g., circular), constellations having various data word/symbol value assignment schemes, and constellations whose data symbols have more than two dimensions. In addition, the invention can be used equally well in block, convolutional or other types of coding applications as well as with various types of modulation including, for example, QAM, phase shift keying, etc.

Each of the various possible approaches will have its own set of advantages and disadvantages, as will be apparent from the foregoing discussion, and the particular embodiment of the invention used for a particular application should, of course, be chosen based on the requirements and characteristics of that application.

It will thus be appreciated that those skilled in the art will be able to devise numerous arrangements which, although not explicitly shown or described herein, embody the principles of the invention and are within its spirit and scope.

What is claimed is:

1. Apparatus comprising
means for receiving a first stream of data words,
means for receiving a second stream of data words, and
means operative when an individual one of said first stream words has one of a predetermined plurality of values for applying to a communication channel an individual one of a predetermined plurality of channel symbols, said one channel symbol being uniquely associated with that one value, and operative when said individual one of said first stream words has at least one other value for applying to said channel a selected one of at least two other channel symbols associated with that one other value, said selected channel symbol being a function of the value of an individual one of said second stream words.

2. The invention of claim 1 wherein each one of said channel symbols comprises a carrier signal having a carrier state that is fixed for the duration of the transmission of that channel symbol.

3. The invention of claim 1 wherein each of said channel symbols is represented by a point in the complex plane and wherein each of said two other channel symbols has one coordinate in common.

4. The invention of claim 1 wherein each of said first stream words is a multibit word and each of said second stream words is a single-bit word.

5. Apparatus comprising
means for receiving a first stream of data words,
means for receiving a second stream of data words, and
coding means operative when an individual one of said first stream words has one of a predetermined plurality of values for applying to a communication channel an individual one of a predetermined plurality of channel symbols uniquely representing that one value, and operative when said individual one of said first stream words has at least one other value and an individual one of said second stream words has a first predetermined value for applying to said channel a first channel symbol jointly representing said first other value and said first predetermined value, and operative when said individual one of said first stream words has said one other value and said individual one of said second stream words has a second predetermined value for applying to said channel a second channel symbol jointly representing said one other value and said second predetermined value.

6. The invention of claim 5 wherein each one of said channel symbols comprises a carrier signal having a carrier state that is fixed for the duration of the transmission of that channel symbol.

7. The invention of claim 6 wherein each of said channel symbols is represented by a point in the complex plane and wherein each of said two other channel symbols has one coordinate in common.

8. The invention of claim 6 wherein each of said first stream words is a multibit word and each of said second stream words is a single-bit word.

9. Apparatus for use in a data communication system which comprises means for receiving a first stream of data words; means for receiving a second stream of data words; and coding means operative when an individual one of said first stream words has one of a predetermined plurality of values for transmitting over a communication channel an individual one of a predetermined plurality of channel symbols uniquely representing that one value, and operative when said individual one of said first stream words has at least one other value and an individual one of said second stream words has a first predetermined value for transmitting over said channel a first other channel symbol jointly representing said first other value and said first predetermined value, and operative when said individual one of said first stream words has said one other value and said individual one of said second stream words has a second predetermined value for transmitting over said channel a second other channel symbol jointly representing said one other value and said second predetermined value; said apparatus comprising means for receiving each of said transmitted channel symbols from said channel, means for applying to a first output the primary stream data word value associated with each received channel symbol, and means operative when an individual one of said received channel symbols is at least said first other channel symbol for applying a signal representing said first predetermined value to a second output, and operative when an individual one of said received channel symbols is at least said second other channel symbol for applying a signal representing said second predetermined value to said second output.

10. The invention of claim 9 wherein each one of said channel symbols comprises a carrier signal having a carrier state that is fixed for the duration of the transmission of that channel symbol.

11. The invention of claim 9 wherein each of said channel symbols is represented by a point in the complex plane and wherein each of said two other channel symbols has one coordinate in common.

12. The invention of claim 9 wherein each of said first stream words is a multibit word and each of said second stream words is a single-bit word.

13. A method comprising the steps of
receiving a first stream of data words,
receiving a second stream of data words,
applying to a communication channel when an individual one of said first stream words has one of a predetermined plurality of values an individual one of a predetermined plurality of channel symbols, said one channel symbol being uniquely associated with that one value, and
applying to said channel when an individual one of said first stream words has at least one other value a selected one of at least two other channel symbols associated with that one other value, said selected channel symbol being a function of the value of an individual one of said second stream words.

14. The invention of claim 13 wherein each one of said channel symbols comprises a carrier signal having a carrier state that is fixed for the duration of the transmission of that channel symbol.

15. The invention of claim 14 wherein each of said channel symbols is represented by a point in the complex plane and wherein each of said two other channel symbols has one coordinate in common.

16. The invention of claim 14 wherein each of said first stream words is a multibit word and each of said second stream words is a single-bit word.

17. A method comprising the steps of
receiving a first stream of data words,
receiving a second stream of data words, and
applying to a communication channel when an individual one of said first stream words has one of a predetermined plurality of values an individual one of a predetermined plurality of channel symbols uniquely representing that one value,
applying to said communication channel when said individual one of said first stream words has at least one other value and an individual one of said second stream words has a first predetermined value a first channel symbol jointly representing said first other value and said first predetermined value, and
applying to said communication channel when said individual one of said first stream words has said one other value and said individual one of said second stream words has a second predetermined value a second channel symbol jointly representing said one other value and said second predetermined value.

18. The invention of claim 17 wherein each one of said channel symbols comprises a carrier signal having a carrier state that is fixed for the duration of the transmission of that channel symbol.

19. The invention of claim 17 wherein each of said channel symbols is represented by a point in the complex plane and wherein each of said two other channel symbols has one coordinate in common.

20. The invention of claim 17 wherein each of said first stream words is a multibit word and each of said second stream words is a single-bit word.

21. A method for use in a data communication system which comprises means for receiving a first stream of data words; means for receiving a second stream of data words; and coding means operative when an individual one of said first stream words has one of a predetermined plurality of values for transmitting over a communication channel an individual one of a predetermined plurality of channel symbols uniquely representing that one value, and operative when said individual one of said first stream words has at least one other value and an individual one of said second stream words has a first predetermined value for transmitting over said other channel a first channel symbol jointly representing said first other value and said first predetermined value, and operative when said individual one of said first stream words has said one other value and said individual one of said second stream words has a second predetermined value for transmitting over said channel a second other channel symbol jointly representing said one other value and said second predetermined value; said method comprising the steps of receiving each of said transmitted channel symbols, applying to a first output the primary stream data word value associated with each received channel symbol, applying a signal representing said first predetermined value to a second output when an individual one of said received channel symbols is at least said first other channel symbol, and applying a signal representing said second predetermined value to said second output when an individual one of said received channel symbols is at least said second other channel symbol.

22. The invention of claim 21 wherein each one of said channel symbols comprises a carrier signal having a carrier state that is fixed for the duration of the transmission of that channel symbol.

23. The invention of claim 22 wherein each of said channel symbols is represented by a point in the complex plane and wherein each of said two other channel symbols has one coordinate in common.

24. The invention of claim 22 wherein each of said first stream words is a multibit word and each of said second stream words is a single-bit word.

* * * * *